Jan. 29, 1952   M. A. WEITERSCHAN   2,583,913
POULTRY SHACKLING DEVICE
Filed Sept. 13, 1950

Michael A. Weiterschan
INVENTOR.

BY *Clarence A. O'Brien*
*and Harvey B. Jacobson*
Attorneys

Patented Jan. 29, 1952

2,583,913

UNITED STATES PATENT OFFICE 2,583,913

POULTRY SHACKLING DEVICE

Michael A. Weiterschan, Broadalbin, N. Y., assignor of one-half to Mabel Weiterschan, Broadalbin, N. Y.

Application September 13, 1950, Serial No. 184,643

1 Claim. (Cl. 99—426)

The present invention relates to a novel poultry holding appliance or accessory and has more particular reference to an especially constructed appliance characterized by prong-means which may be forced into and anchored in the tail of a chicken and complemental means which embraces and shackles the legs of the chicken to the tail, in a now somewhat well known manner to facilitate retaining the chicken in a baking pan while being cooked in an oven.

It is a matter of common knowledge to those familiar with baking pan appliances and accessories that many and varied styles have been disclosed in prior patents and that they are variously referred to as basting and roasting devices, fowl-dressing appliances, poultry leg-trussing devices and the like. Generally, devices in this field of endeavor embrace and restrain the legs and fasten the same in one manner or another to the tail. Some devices are constructed with the idea of mechanically drawing the usual stuffings containing pocket together to facilitate roasting and to obviate the necessity of stitching or otherwise lacing the pocket closed. The instant invention accomplishes the same broad ends but is thought to be an improvement over other devices so far devised by others in that its construction is more aptly suited for the intended purposes and provides that in which manufacturers and users will find their essential needs fully met, contained and effectually available.

An aspect of novelty in the instant device has to do with two units which are slidably and adjustably connected together. One unit constitutes a base, is conveniently shaped to accommodate the gripping and holding by the fingers of the user, said base having tail impaling prongs or tines, the outer unit being a slide and slidable on the standard carried by the base unit, said slide being provided with a pair of suitably shaped hooks to engage the legs and to permit same to be mechanically forced down toward and held as close as needed to the tail, whereby to provide for compactness and to aid good cooking results.

More specifically, novelty is predicated upon a base unit which has a slotted upright and which is adapted to rest with requisite nicety and firmness on the bottom of the baking pan or on the openwork grille, as the case may be.

Then, too, novelty has to do with the slide unit which is fashioned from a strap of metal having an intermediate U-shaped portion and terminal hook, the U-shaped portion having a shoe which is adjustable on the slotted upright.

Other objects and advantages will become more readily apparent from the following description and the accompanying sheet of illustrative drawings:

In the drawings: wherein like numerals are employed to designate like parts throughout the views.

Figure 1:
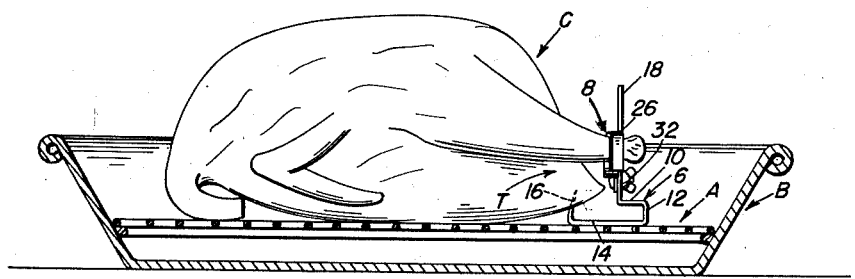
Figure 1 is a view showing a chicken roasting pan, showing the chicken in the pan ready to be cooked and illustrating the shackling appliance constituting the invention at bar.

Referring now to the drawings by reference numerals and lead lines the relatively stationary base unit is denoted by the numeral 6 and the companion relatively movable slide and shackling unit is denoted by the numeral 8. Unit 6 is formed from a length of strap metal which has a U-shaped bend including portions 10, 12 and 14 which define a finger-grip and also provide a satisfactory base, the element 14, to rest firmly on the grille A in the roasting pan B, as best shown in Figure 1. The limb or base portion 14 is extended and provided with upstanding prongs or tines 16 which are adapted to be embedded in the tail T of the roasting chicken C shown in Figure 1. This unit 6 also includes an upright 18 rising vertically from the portion 10 and having a central longitudinal slot 20 which in practice is some four inches in length.

Figure 2:
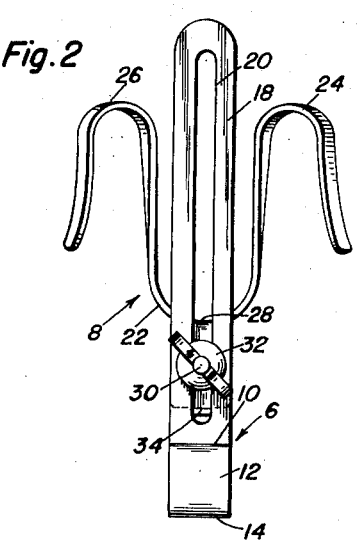
Figure 2 is a rear elevation of the appliance observing same in a direction from right to left in Figure 1.
Figure 3:
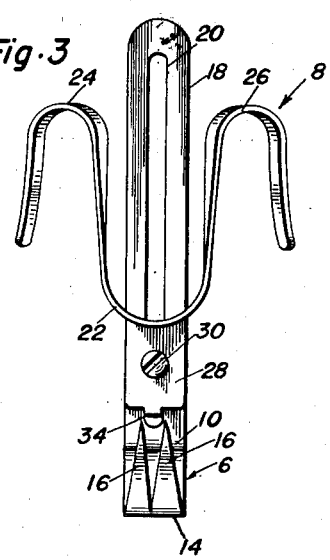
Figure 3 is a front elevation observing the appliance from left to right in Figure 1; and, Figure 4 is a side elevation showing the picturization in Figure 2 turned 90 degrees from left to right.
Figure 4:
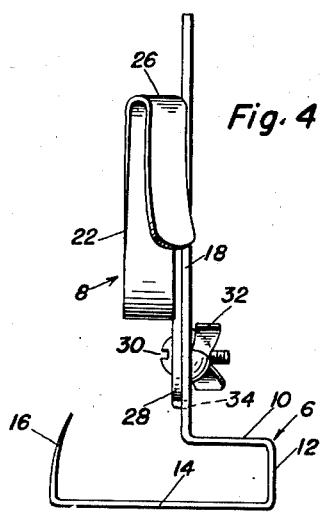

The unit 8 is formed from strap metal and this is characterized by a substantially U-shaped portion 22 and the free ends of the arms of the U are bent outwardly and formed into shackling hooks 24 and 26 which are shackled over the legs of the chicken as best shown in Figure 1. The bight portion is formed with an integral extension which may be described as a lug or shoe 28 and this is slidable against the slotted upright and is provided with an assembling and retaining bolt 30 carrying a clamping nut, preferably a simple wing nut 32. The lower end of the shoe has a lateral detent 34 which projects into and works up and down in the slot 20. This detent prevents the unit 8 from rocking from side to side in the positions shown in Figures 2 and 3. In other words, the detent key the shoe 28 to the upright by way of the slot and the bolt and nut means serves to fasten the shoe so that the shoe works up and down on the upright and may be locked by the bolt and nut means in any desired or set position. By adjusting the shoe the shackling hooks may be regulated in relation to the pointed prongs or tines 16 to not only satisfactorily anchor the tines in the tail of the chicken but also to bring the two legs forcibly down in the direction of the tail to compactly associate the legs and tail and to thus shape up the chicken for effective retention in the pan and also for more satisfactory baking or roasting results as the case may be.

Broadly, the invention has to do with the two units 6 and 8, the base unit 6 with the slotted upright and the slide unit 8 with shoe and means for adjustably clamping the shoe on the upright.

It is understood that the appliance shown and described, due to its extensive range of adjustment, may be used for shackling the legs of small, large or medium chickens and for that matter, may be successfully used for turkeys and other edible fowls.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

A poultry shackling appliance of the class shown and described comprising a base unit including a U-shaped portion, one limb being extended and terminating in upstanding pointed prongs, the other limb being provided with an upstanding portion which is longitudinally slotted and provides an upright, a slide unit, said slide unit having a shoe superimposed against and slidable on the slotted upright, bolt and nut means carried by said shoe and operable in the slot in said upright, a U-shaped member having a bight portion attached to and carried by the shoe, said U-shaped member having arms whose free ends are formed with return bends defining complemental leg shackling hooks, said shoe being provided with a lateral detent, said detent being slidable in the slot in said upright.

MICHAEL A. WEITERSCHAN.

REFERENCES CITED

The following references are of record in the file of this patent:

UNITED STATES PATENTS

| Number | Name | Date |
| --- | --- | --- |
| 728,067 | Young | May 12, 1903 |
| 1,123,019 | Selden | Dec. 29, 1914 |
| 1,409,731 | Le Jeunesse | Mar. 14, 1922 |
| 1,633,499 | Selden | June 21, 1927 |
| 2,189,421 | Huschka | Feb. 6, 1940 |
| 2,516,359 | Zoller | July 25, 1950 |